United States Patent [19]

Numata

[11] Patent Number: 5,617,305

[45] Date of Patent: Apr. 1, 1997

[54] CURRENT RESONANCE TYPE SWITCHING POWER SUPPLY CIRCUIT

[75] Inventor: Masato Numata, Kanagawa, Japan

[73] Assignee: Sony Corporation, Tokyo, Japan

[21] Appl. No.: 522,565

[22] Filed: Sep. 1, 1995

[30]     Foreign Application Priority Data

Sep. 8, 1994 [JP] Japan .................................. 6-239635
Nov. 16, 1994 [JP] Japan .................................. 6-305730

[51] Int. Cl.$^6$ .......................... H02M 3/335; H02M 3/24; H02M 5/42
[52] U.S. Cl. ............................ 363/16; 363/17
[58] Field of Search .................. 363/22, 24, 16, 363/17, 98, 132, 20

[56]            References Cited

U.S. PATENT DOCUMENTS

| | | | |
|---|---|---|---|
| 4,347,558 | 8/1982 | Kalinsky | 363/17 |
| 4,525,774 | 6/1985 | Kino et al. | 363/17 |
| 4,675,796 | 6/1987 | Gautherin et al. | 363/20 |
| 5,267,132 | 11/1993 | Gulczynski | 363/16 |
| 5,481,449 | 1/1996 | Kheraluwala et al. | 363/17 |

*Primary Examiner*—Peter S. Wong
*Assistant Examiner*—Bao Q. Vu
*Attorney, Agent, or Firm*—Jay H. Maioli

[57]            ABSTRACT

A current resonance type switching power supply circuit in which a power factor and a voltage regulation in the power supply are improved includes switching elements for interrupting either a voltage or a current output from a DC power supply and supplying the output to primary windings of an insulating transformer and a non-insulating transformer. The switching power supply circuit receives a predetermined alternating voltage from the insulating transformer, and is driven by a DC power supply including a rectifying means for rectifying an AC power supply, a decoupling capacitor arranged at an output side of the rectifying means so as to eliminate noise, a secondary winding of the non-insulating transformer, and a smoothing capacitor charged by a charging circuit including a diode and a choke coil.

5 Claims, 6 Drawing Sheets

CURRENT RESONANCE TYPE SWITCHING POWER SUPPLY CIRCUIT

BACKGROUND OF THE INVENTION

1. Field of the Invention

This invention relates to a switching power supply circuit, more particularly to a switching power supply circuit in which a power factor of the power supply and a voltage regulation are improved.

2. Description of Related Art

Increasing the switching frequency in a switching power supply may allow a transformer or other devices to be reduced in size enabling the switching power supply to be used as a power supply for various electronic equipment by acting as an AC-DC converter of high electrical power.

In general, when a commercial power supply is rectified, an electrical current flowing in a smoothing circuit shows a distorted waveform, which may produce a problem in that a power factor indicating an utilization efficiency of the power supply is deteriorated.

In addition, it is required to provide a countermeasure to prevent an occurrence of a higher harmonic generated when the current shows a distorted waveform.

In order to improve the power factor of the power supply, the simplest method is to use a choke input type rectifying circuit, for example, and this method is preferable in view of applying a countermeasure against an electromagnetic noise (EMI). However, this system requires an inductor having a high impedance as a choke coil, resulting in that a size reduction of electronic equipment is prohibited by this requirement and at the same time also causing its cost to be increased.

In particular, in the case of a power supply of a 100-V system or a 200-V system, it is necessary to prepare different kinds of choke coils for each of the systems and, for a power supply for a TV set or the like, a costly shield is necessary for preventing oscillation of a TV screen caused by a leaked magnetic flux.

In view of such a situation as described above, a smoothing circuit of a capacitorless system in which an output of a rectifying circuit is directly connected or disconnected so as to drive the switching power supply, or an active filter or partial rectifying system for connecting or disconnecting the output of the rectifying circuit at a high frequency is employed.

The capacitorless system is constructed such that a smoothing capacitor for the power supply for use in driving the switching power supply is eliminated, wherein it shows a high effect of improving the power factor and a ripple voltage of twice the frequency of a commercial power supply is overlapped on the output of a secondary side. However, it shows a poor regulation and at the same time it does not tolerate an instant disconnection of an input voltage and so this system can not be used as a power supply device of high capacity.

The active filter system is operated such that both an input voltage and an input current are detected and a switching control is carried out in such a way that a waveform of the input current may approach a waveform of the input voltage, wherein its power factor may be set approximately to 1. This, requires two units of converters, resulting in a circuit that is complex in its configuration and an utilization efficiency of the power supply that is deteriorated. In addition, switching noise is increased and a countermeasure against the increased noise (EMI) may increase its cost.

In addition, although the partial smoothing circuit is constructed such that a choke coil arranged in a circuit for charging the smoothing capacitor is switched to expand a continuity angle of a rectifying element, there remain the problems of applying a countermeasure against noise, a reduction in efficiency, and an increased ripple voltage.

In addition, there is a certain difficulty in providing a concurrent improvement of both power factor and efficiency, and this difficulty may not be acknowledged in view of the aforesaid countermeasure against EMI. In view of this fact, a magnet switch system (hereinafter called as an MS system) has been proposed in which an interrupted voltage of the switching power supply is utilized to reduce a charging voltage of the smoothing capacitor and a continuity angle of a rectifying element is expanded to improve the power factor.

FIG. 6A shows one example of the aforesaid switching power supply circuit of the MS system, wherein a power used in be supplied to the switching power supply circuit is constructed such that a commercial power supply AC is full-wave rectified through a bridge rectifying diode D1 and at the same time this rectified voltage is supplied to a smoothing capacitor C1 through a choke coil CH and a third winding N3 of an isolating transformer CT.

Q1 denotes a switching element (MOSFET) for interrupting a voltage charged in the smoothing capacitor C1 through a primary winding of the isolating transformer CT. An alternating voltage induced in a secondary winding of the isolating transformer is rectified through rectifying diodes D4, D5, and smoothed by a coil L and a capacitor C3, resulting in a DC output voltage E0.

Then, this output voltage E0 controls a control circuit for generating a driving pulse of the switching element through a photocoupler, and performs a PWM modulation for changing a pulse width of the driving pulse, thereby a characteristic of constant voltage can be attained.

As shown in FIG. 6B, this switching power supply circuit is operated such that an electrical current $I_{AC}$ charged to the smoothing capacitor C1 flows with a waveform resembling a voltage waveform $V_{AC}$ Of the commercial power supply to be supplied. That is, since the electrical current charged to the smoothing capacitor C1 is interrupted by a switching voltage of the switching power supply circuit generated in the third winding N3, its mean current waveform $I_{AC}$ flows even in the case when an amplitude of $V_{AC}$ is low as shown in FIG. 6B and therefore the current waveform $I_{AC}$ approximates that of $V_{AC}$.

As a result, the power factor of the switching power supply acting as an AC load is improved.

However, since this power supply system of MS type is constructed such that the third winding N3 is supplied to the aforesaid isolating transformer CT, the current flowing in the primary winding N1 is varied at a period of twice of that of the commercial power supply, and its peak current becomes approximately twice of that of the conventional type, resulting in noise generated by the transformer being increased and a heat generated at the windings and the core also being increased.

In addition, since the voltage is also varied in a similar period, a ripple voltage having this period is increased at the output voltage E0.

In addition, since each of the diodes constituting the bridge rectifying diode D1 is interrupted at the switching frequency, it is necessary to provide an expensive rectifying element in which each of the diodes can perform a high speed switching of high current.

SUMMARY OF THE INVENTION

This invention has been accomplished in order to solve the aforesaid problem, by providing a switching element for interrupting either a voltage or a current outputted from a DC power supply and supplying it to a primary side of an insulating transformer or a non-isolating transformer, a switching power supply circuit capable of receiving a predetermined alternating voltage from a secondary side of the aforesaid isolating transformer, a rectifying means for rectifying an AC power supply as a driving power supply for the aforesaid switching power supply, a decoupling capacitor arranged at an output side of the aforesaid rectifying means so as to eliminate noise, a secondary winding of the non-isolating transformer, and a smoothing capacitor charged by a charging circuit comprised of a diode and a choke coil.

In addition, the aforesaid switching element is connected in half bridge to the isolating transformer, its switching frequency is changed in response to an output voltage and then a characteristic of constant voltage is attained.

The charging circuit is comprised of the decoupling capacitor of which one end is arranged at the output side of the rectifying circuit to restrict the switching voltage such that the diode element is turned on/off at the switching frequency, wherein the switching voltage is overlapped and supplied to the charging circuit so that the continuity angle of the charging current of the smoothing capacitor is increased and its power factor can be improved.

In addition, use of a leakage inductance in place of the choke coil enables the choke coil to be eliminated.

Further, since the switching frequency is controlled to be increased under a light load, an impedance of the choke coil may effectively act even under the light load to enable an effect of restricting the ripple voltage to be increased.

As described above, the current resonance type switching power supply of the present invention is constructed such that a decoupling capacitor having a sufficient low impedance against the switching frequency and a switching diode having a high-speed recovery characteristic are arranged at the output side of the rectifying circuit for use in rectifying the AC power supply, and further the switching voltage is supplied from the transformer for generating a switching voltage to this rectifying output circuit, so that a wide continuity angle of the current for charging the smoothing capacitor is attained and the power factor is remarkably improved.

Further, when the switching power supply of the current resonance type is is constructed such that the switching frequency is controlled in response to a DC output, the inductance of the choke coil at the rectifying circuit may effectively act even under a light load, and therefore a variation in the power factor may be reduced even against a variation in the electrical power load.

DETAILED DESCRIPTION OF THE PREFERRED EMBODIMENTS

Figure 1:
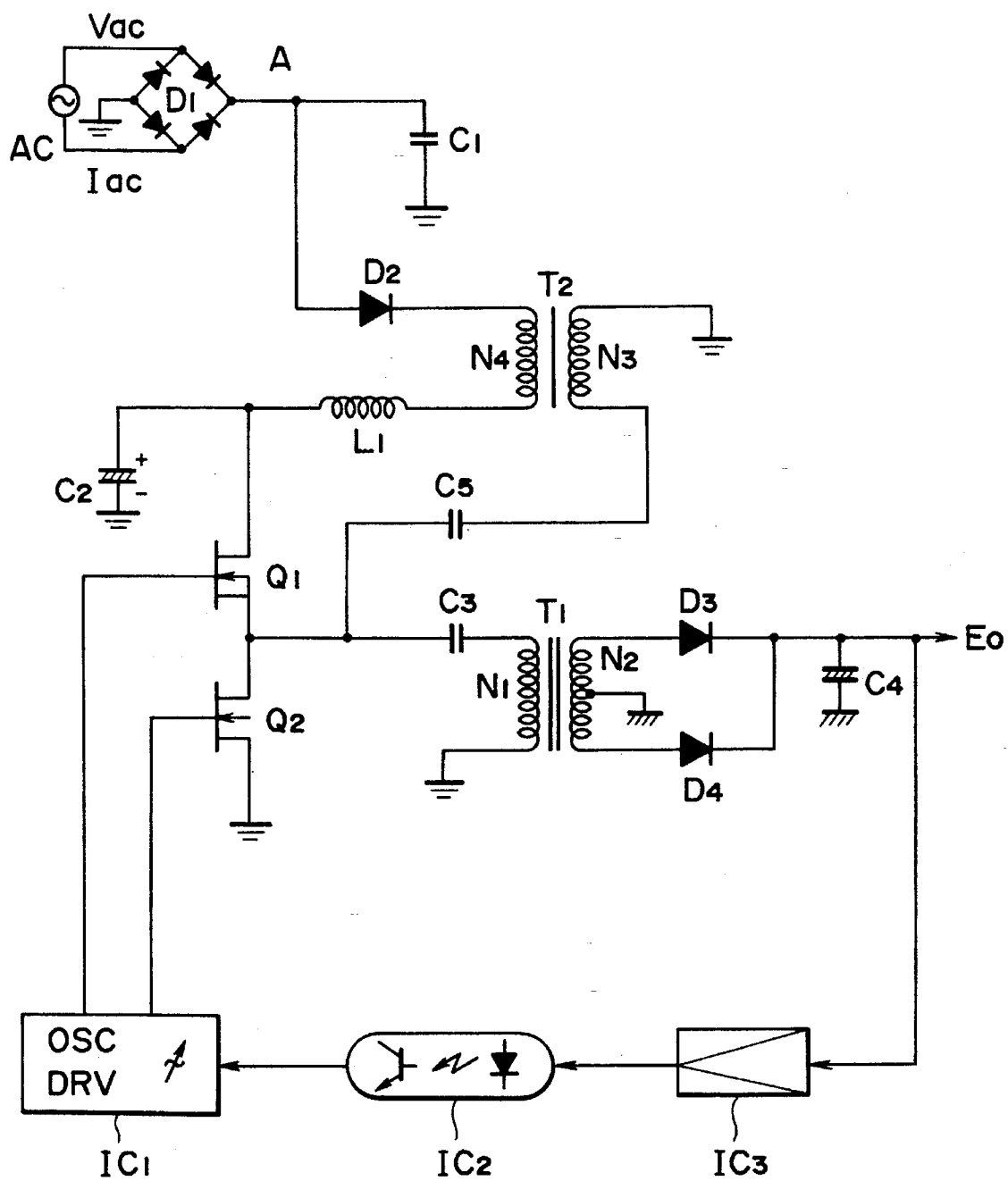
FIG. 1 is a view showing the preferred embodiment of the current resonance type switching power supply circuit of the present invention.

FIG. 1 is a switching power supply circuit indicating the preferred embodiment of the present invention, wherein AC denotes an AC power supply and D1 denotes a bridge type rectifying circuit. Q1 and Q2 denote switching elements for forming a half bridge type switching circuit, wherein its output is supplied to the primary winding N1 of an isolating transformer T1 through a capacitor C3.

A voltage induced at the secondary winding N2 of the isolating transformer T1 is converted into a DC voltage through rectifying elements D3, D4 and produces an output voltage E0.

To the non-isolating transformer T2 are applied the primary winding N3 and the secondary winding N4 in a winding ratio of 1:1, for example, a switching voltage corresponding to a resonance current flowing in the non-isolating transformer T2 and the capacitor C5 is outputted and overlapped on a charging path of the capacitor C2.

In addition, an output of the bridge type rectifying circuit D1 is connected to a ground by the decoupling capacitor C1 with an impedance which is sufficiently low as compared with a switching frequency, and then a charging path is formed against the capacitor C2 through a high-speed recovery type switching diode D2, the aforesaid secondary winding N4 and the choke coil L1.

To the oscillation control circuit IC1 for alternately driving the switching elements Q1, Q2 to their ON/OFF states is inputted a control signal corresponding to a voltage supplied to a load through an amplifier IC3 for amplifying the output voltage E0 and the photocoupler IC2, wherein a switching frequency of each of the switching elements is controlled by a control signal supplied to the oscillation control circuit IC1.

Then, a constant voltage control for keeping the DC output E0 constant is carried out by a so-called upper-side control in which when the DC output E0 is higher than a specified value, the switching frequency is increased, and in turn when the DC output E0 is lower than the specified value (under a high load), the switching frequency is decreased.

For the switching power supply circuit constructed as described above, elimination of the decoupling capacitor C1, the switching diode D2, the non-isolating transformer T2 and the capacitor C5 causes this switching power supply circuit to operate as a normal current resonance type switching power supply circuit.

That is, in this case, the switching elements Q1, Q2 repeat their ON/OFF states alternately with the terminal voltage of the capacitor C1 being applied as an operating power supply so as to cause the drive current approximating resonance current waveform to be supplied to the primary coil N1 of the isolating transformer T1 and then an alternating output may be attained at the secondary coil N2.

When the DC output voltage at the secondary side is decreased, it is controlled in such a way that the switching frequency is decreased by the oscillation control circuit IC (in such a way that it may approach the resonance frequency) and further it is controlled in such a way that the drive current flowing in the primary winding N1 may be increased.

Since the charging current is supplied to the capacitor C2 only when its terminal voltage is lower than the rectifying voltage, the continuity angle of the rectifying element is low and the power factor is about 0.6.

However, in the case of the switching power supply circuit of the present invention, the secondary winding N4 is inserted into the charging path of the decoupling capacitor C1 and the switching voltage (for example, 100 KHz) corresponding to the switching current is overlapped on the smoothing choke coil L1 causing the terminal voltage of the capacitor C2 to be increased at the switching period.

Figure 2:
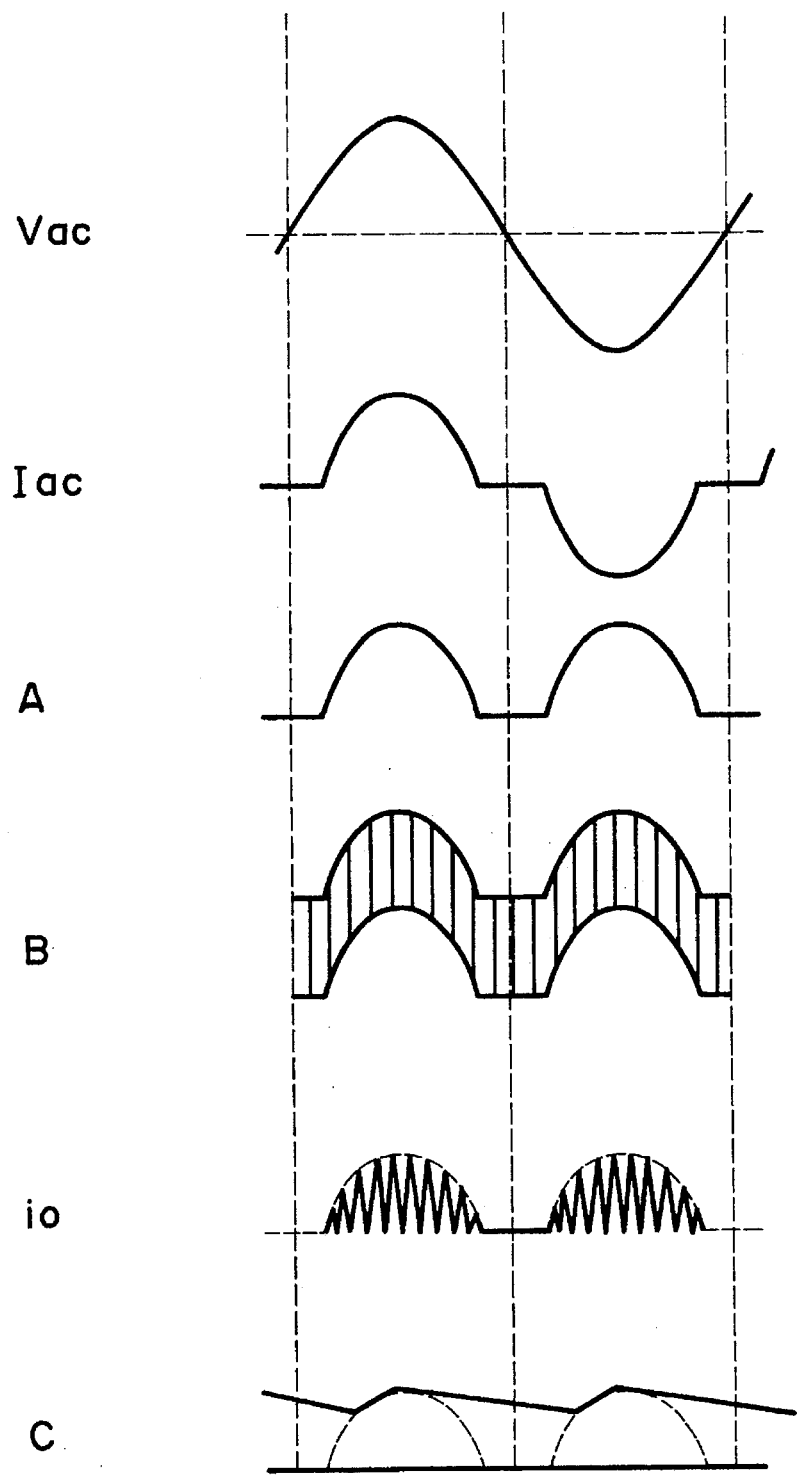
FIG. 2 shows waveforms of rectified voltage and rectified current in the power supply circuit of FIG. 1.

That is, as shown in the waveforms of FIG. 2, the voltage at A in respect to the AC voltage $V_{AC}$ and the AC current $I_{AC}$ becomes a full-wave rectified voltage. However, the switching voltage E0 induced at the secondary winding N4 is applied as a charging voltage against the capacitor C2 through the diode D2, the decoupling capacitor C1 and the choke coil L1.

Then, since this voltage is overlapped on the full-wave rectified voltage, the charging current i0 flows at a switching frequency in respect to a potential between the voltage at B and the terminal voltage point C of the capacitor C2 and a mean waveform of this current becomes approximately the same waveform as that of the rectified voltage. Accordingly, a continuity angle of the charging current becomes wide and a power factor of the switching power supply is improved.

In addition, the switching voltage ES to be overlapped is set such that outputs from the switching elements Q1 and Q2 are supplied to the primary winding N3 of the non-isolating transformer T2 through the capacitor C5 and induced at the secondary winding N4, wherein it is independent from an outputting circuit comprised of the isolating transformer T1 and the capacitor C3, resulting in that noise generated from the isolating transformer T1 and heat generated at the core as well as at the winding are not increased and further variation of output voltage obtained from the secondary side of the isolating transformer or deterioration of the ripple voltage may not occur.

It is satisfactory that the decoupling capacitor C1 and the choke coil L1 have such an impedance value as to restrict a high frequency ripple and for example, the decoupling capacitor C1 is set to 1 to 2 μF and the choke coil L1 is set to several μH to several tens μH.

In the case of this preferred embodiment, the power factor under a condition of the winding ratio of 1:1 of the non-isolating transformer could be set to about 0.95. In this case, when the winding ratio is 2:1, the power factor is decreased down to 0.8 to 0.85. However, this value could sufficiently clear the power factor of the target value of the specified one and the power supply efficiency could be improved by about 1% to 2% as compared with that of the conventional power supply.

In the case that the power factor improving circuit of the aforesaid choke-in-input type or the aforesaid active filter type is applied, a reduction in current at the time of light load causes an effect of the choke coil to be decreased and further the power factor to be deteriorated, although the switching power supply of the present invention is controlled in such a way that a switching frequency of the isolating transformer T1 is increased at the time of light load, resulting in that in turn at the time of light load, the impedance of the choke coil L1 is increased. Accordingly, the present invention has an advantage that the power factor is kept substantially constant over a wide range from a high load to a light load.

Figure 3A:
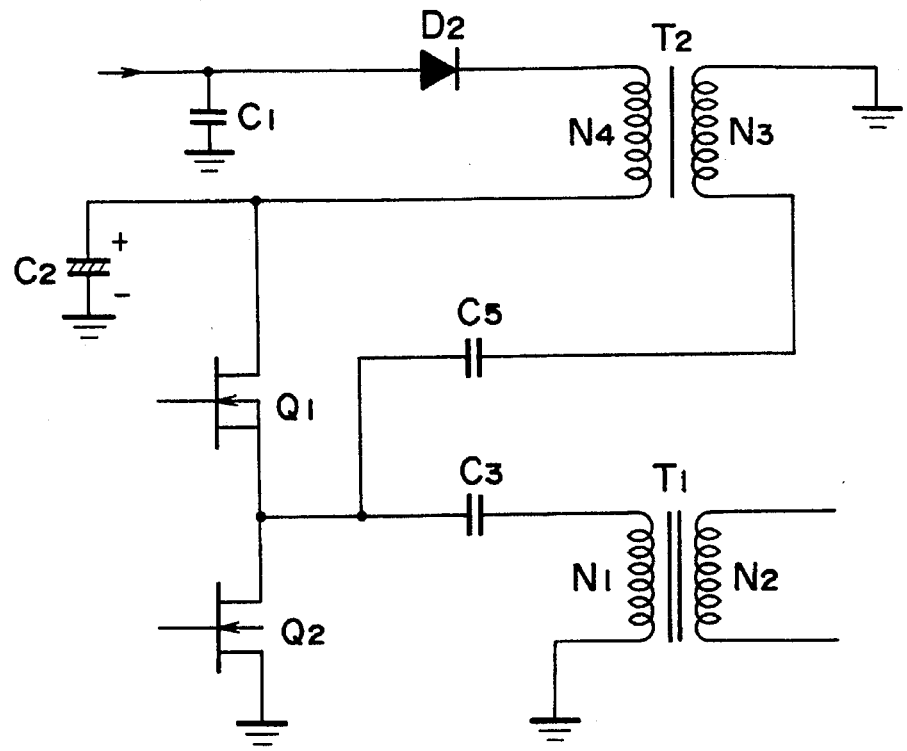
FIGS. 3A and 3B are circuit diagrams showing a modified form of a substantial part of the present invention.
Figure 3B:
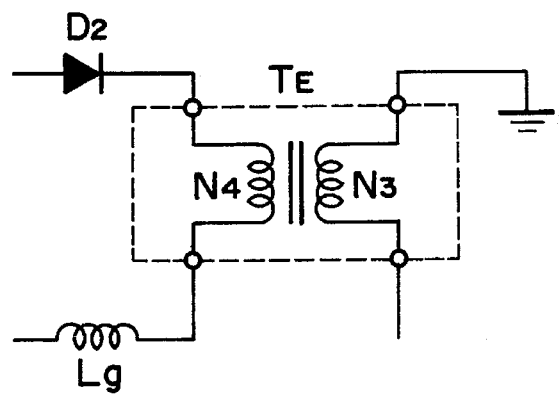

FIGS. 3A and 3B show another preferred embodiment of a substantial part of the power supply resonance type switching power supply circuit of the present invention, wherein the secondary winding N4 wound at the non-isolating transformer T2 shown in FIG. 1 is arranged at a position where it is magnetically spaced apart with respect to the primary winding N3.

That is, arrangement of the secondary winding at a position spaced apart magnetically from the primary winding N3, for example, arrangement of the primary winding and the secondary winding at different positions from each other or at the different magnetic path, causes a leaked magnetic flux to be accidentally increased.

Then, since its equivalent transformer circuit shows a transmittance characteristic having a leakage inductance Lg added against a rational transformer TM as shown in FIG. 3B, this leakage inductance Lg can be utilized as the choke coil L1 of FIG. 1.

Accordingly, in accordance with the preferred embodiment of the present invention, it has advantages that the choke coil L1 can be eliminated and a circuit configuration can be simplified.

Figure 4:
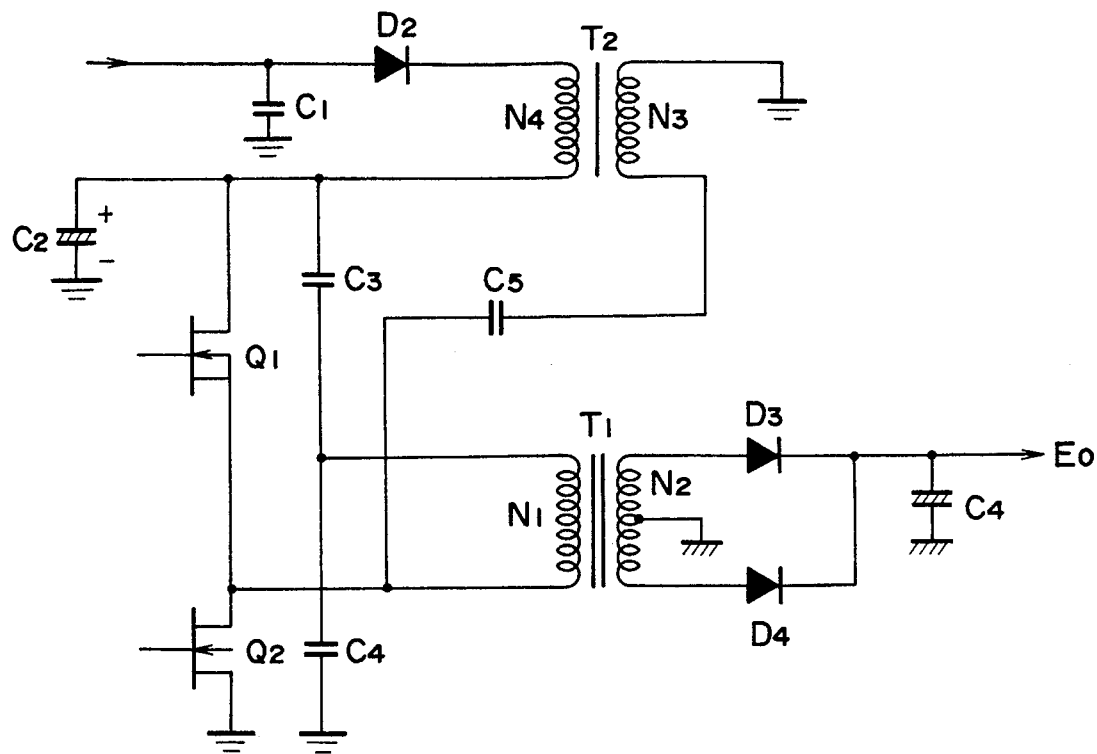
FIG. 4 is a view showing a half bridge type power supply circuit preferably used when the present invention is used with a commercial high power supply.

FIG. 4 shows a modified example of the present invention, wherein the capacitors C3, C4 are connected in parallel with the switching transistors Q1 and Q2 connected in series from each other so as to constitute a half bridge type converter.

Since this type of switching power supply has its power supply voltage divided by the capacitors C3, C4, it has advantages that it can be accommodated for a high AC power supply (200 V) and an element having a low voltage-proof characteristic acting as a switching transistor can be used.

Figure 5:
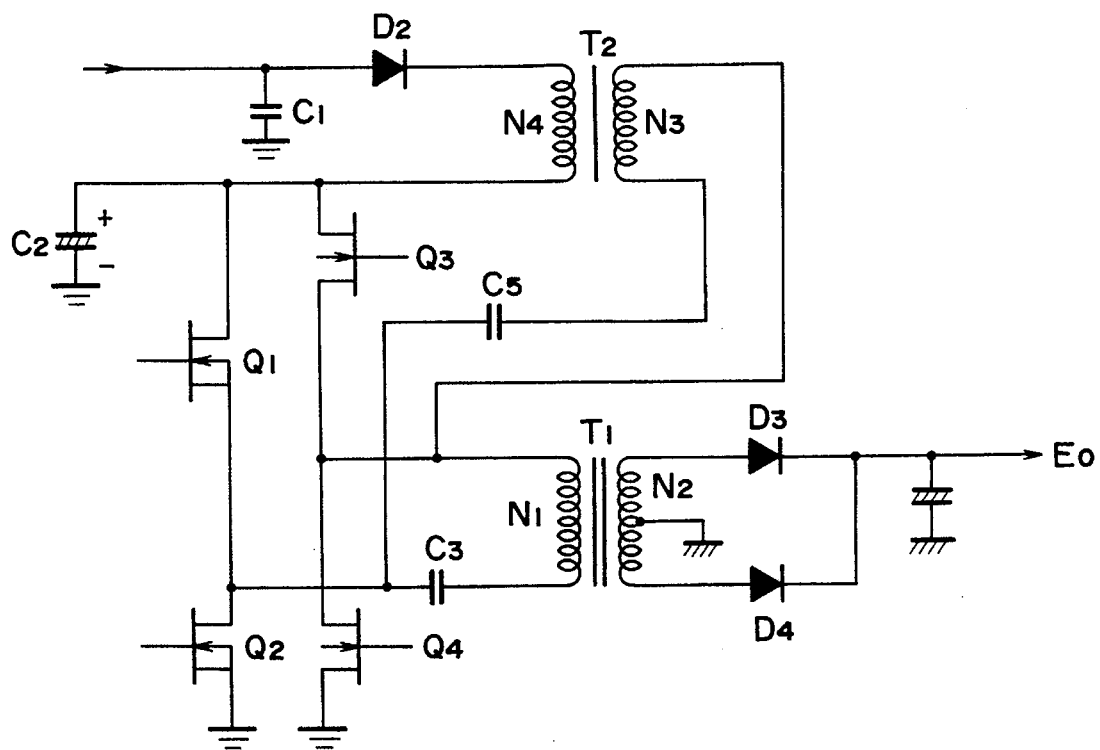
FIG. 5 is a circuit diagram for when the present invention is applied to a full bridge type switching power supply.
Figure 6A:
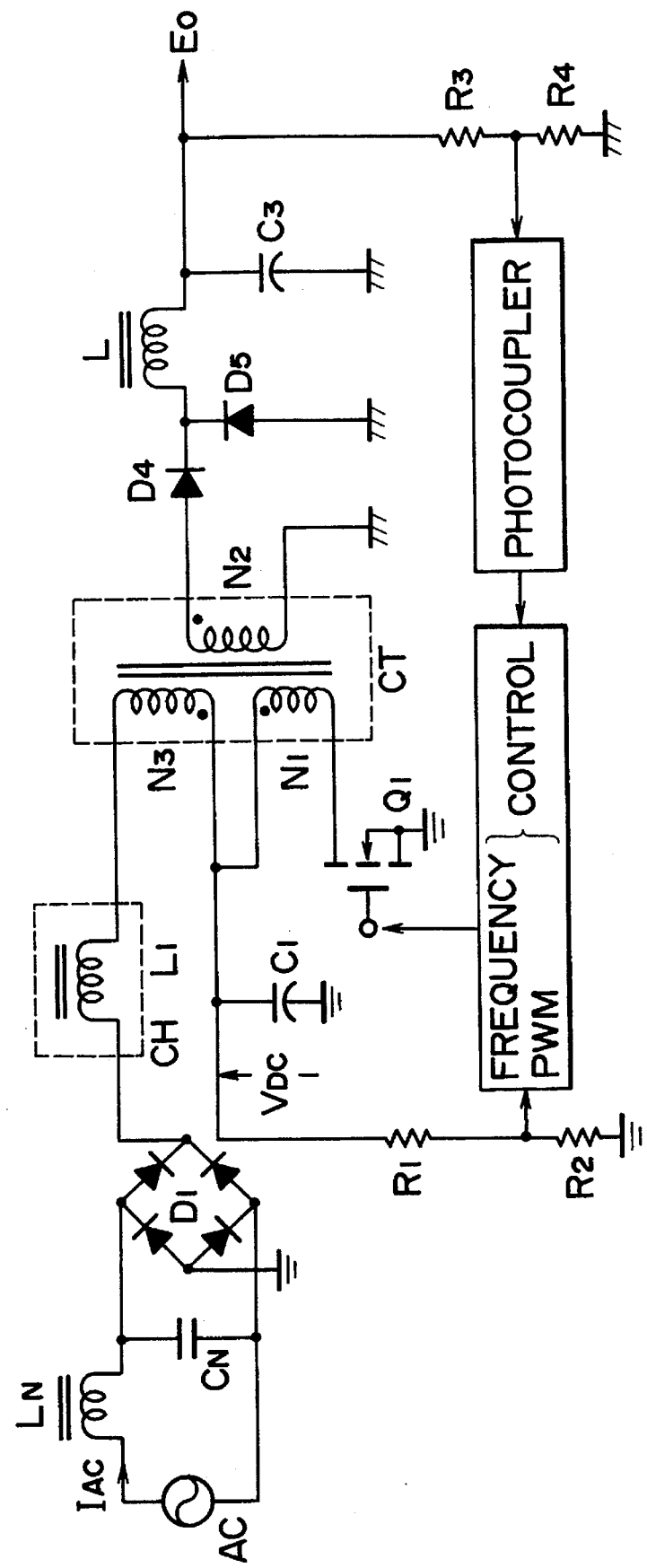
FIGS. 6A and 6B show a power supply circuit diagram having an MS type power factor improvement and corresponding waveforms.
Figure 6B:
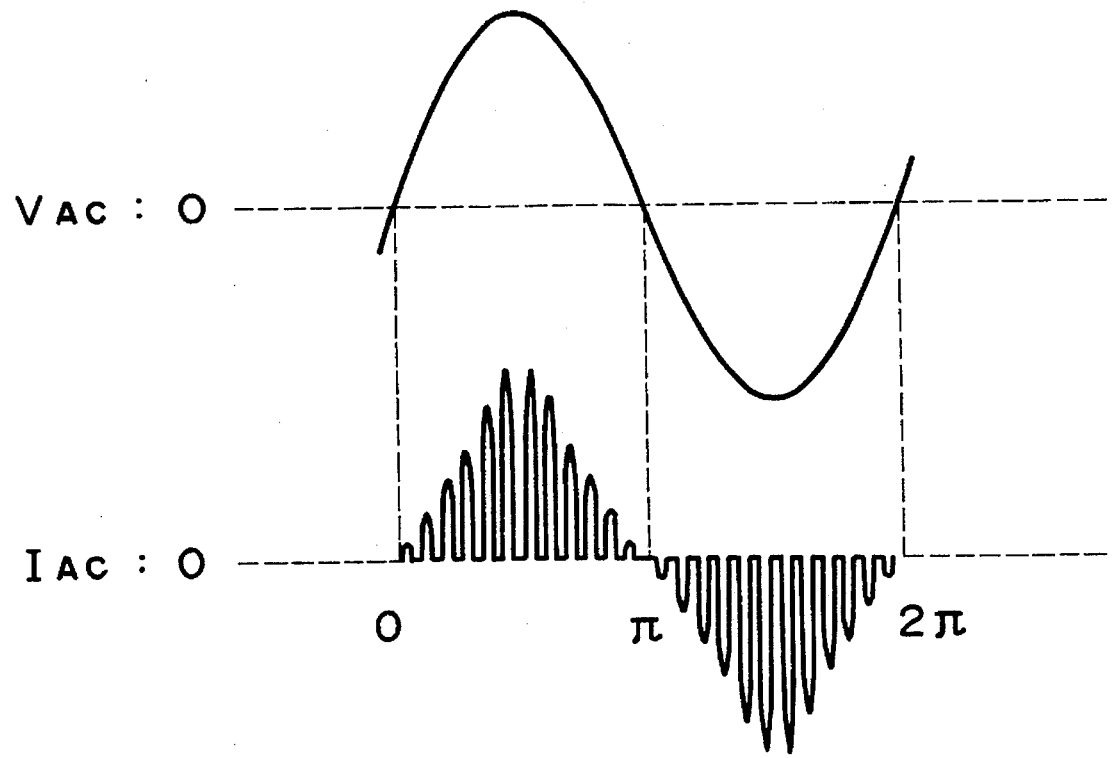

In addition, it is also possible that four switching transistors Q1, Q2, Q3 and Q4 are applied for constructing the full bridge type power supply circuit as shown in FIG. 5.

Although this full bridge type converter has a complex driving circuit, it can be used as a power supply circuit having a high output.

Each of the circuits shown in FIGS. 4 and 5 has the non-isolating transformer T2, wherein an output voltage is fed back from the secondary winding N4 to the charging circuit so as to improve a power factor.

Although each of the aforesaid preferred embodiments has indicated the case in which MOSFET is used as a switching element, it is apparent that a bipolar type transistor may be used as the switching element.

In addition, it may also be possible that the drive signal for interrupting the switching element is driven by the switching current, with a drive transformer having an output which may be set from the secondary side of the drive transformer. In this case, a magnetic characteristic of the drive transformer is changed in response to a DC output voltage, thereby a self-exciting type switching power supply in which the switching frequency is made variable can be attained.

What is claimed is:

1. A current resonance type switching power supply circuit, comprising:

switching elements for interrupting either a voltage or a current and for supplying a switched output to a first side of a primary winding of an isolating transformer and a first side of a primary winding of a non-isolating transformer, a second side of the isolating transformer and a second side of the non-isolating transformer being connected to ground potential; and a switching power supply circuit for receiving a predetermined alternating voltage from a secondary winding of said isolating transformer and for controlling the switching of said switching elements, said switching elements being adapted to switch either said voltage or said current input thereto, said voltage or said current being received from a circuit including a DC power supply comprised of a rectifying means for rectifying an AC power supply, a decoupling capacitor arranged at an output side of said rectifying means to eliminate noise, a secondary winding of said non-isolating transformer having a first side and a second side, a diode connected at a first end between said output side of said rectifying means and said decoupling capacitor, the first side of said secondary winding of said non-isolating transformer being connected to a second end of said diode and a second side of said secondary winding of said non-isolating transformer being connected to a first end of a choke coil, a second end of the choke coil being connected to said switching elements, and a smoothing capacitor connected between said choke coil and said switching elements in parallel with said switching elements, said smoothing capacitor being charged by said diode and said choke coil.

2. A current resonance type switching power supply circuit according to claim 1, wherein said switching elements are connected in half bridge to said first side of said primary winding of said isolating transformer.

3. A current resonance type switching power supply circuit according to claim 1, wherein said choke coil is comprised of a leakage inductance of said primary winding and said secondary winding of said non-isolating transformer.

4. A current resonance type switching power supply circuit according to claim 2, wherein said choke coil is comprised of a leakage inductance of said primary winding and said secondary winding of said non-isolating transformer.

5. A current resonance type switching power supply circuit, comprising:

an AC power supply for producing an AC voltage;

rectifying means for rectifying said AC voltage from said AC power supply;

a decoupling capacitor connected to said rectifying means for eliminating noise from a rectified voltage output therefrom;

a non-isolating transformer having a primary winding and a secondary winding;

a diode connected at a first end between said rectifying means and said decoupling capacitor;

a first side of said secondary winding of said non-isolating transformer being connected to a second end of said diode;

a first end of a choke coil being connected to a second side of said secondary winding of said non-isolating transformer;

a smoothing capacitor charged by a charging circuit formed of said diode, said secondary winding of said non-isolating transformer, and said choke coil;

an isolating transformer having a primary winding and a secondary winding;

switching elements connected to a second end of said choke coil between said choke coil and said smoothing capacitor and to said primary winding of said isolating transformer; and a switching power supply circuit for receiving a predetermined alternating voltage from said isolating transformer, wherein said rectifying means, said decoupling capacitor, said secondary winding of said non-isolating transformer, and said smoothing capacitor form a DC power supply, and said switching elements interrupt either a voltage or a current output from said DC power supply and supply said output to said primary winding of said isolating transformer and to said primary winding of said non-isolating transformer.

* * * * *